(12) United States Patent
Kremer

(10) Patent No.: US 7,427,350 B2
(45) Date of Patent: Sep. 23, 2008

(54) SILICONE DEFOAMER TO BETTER CONTROL HYDROCARBON FOAM AND REDUCE SILICON CONTENT OF LIQUID HYDROCARBON PRODUCTS

(75) Inventor: Lawrence N. Kremer, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 579 days.

(21) Appl. No.: 10/988,901

(22) Filed: Nov. 15, 2004

(65) Prior Publication Data

US 2005/0109675 A1     May 26, 2005

Related U.S. Application Data

(60) Provisional application No. 60/525,235, filed on Nov. 25, 2003.

(51) Int. Cl.
*C10G 9/14*     (2006.01)
(52) U.S. Cl. .................................................. 208/131
(58) Field of Classification Search .................. 208/131
See application file for complete search history.

(56) References Cited

U.S. PATENT DOCUMENTS

| 4,082,690 | A |   | 4/1978  | Farminer        |         |
|-----------|---|---|---------|-----------------|---------|
| 4,176,047 | A |   | 11/1979 | Orrell et al.   |         |
| 4,486,336 | A |   | 12/1984 | Pape et al.     |         |
| 4,639,489 | A |   | 1/1987  | Aizawa et al.   |         |
| 5,667,669 | A | * | 9/1997  | Hart ........... | 208/131 |
| 5,853,617 | A |   | 12/1998 | Gallagher et al.|         |
| 5,861,453 | A |   | 1/1999  | Datz-Siegel et al. |      |
| 5,908,891 | A |   | 6/1999  | Fey et al.      |         |
| 6,476,095 | B2| * | 11/2002 | Simendinger, III | 523/122 |
| 2003/0119917 | A1 |   | 6/2003 | Fey et al.     |         |

FOREIGN PATENT DOCUMENTS

EP     0 663 225 A1     7/1995

OTHER PUBLICATIONS

Perry, R.H.; Green, D.W., Perry's Chemical Engineers' Handbook, 1997, McGraw-Hill, 7th Edition, p. 27-9.*
L. N. Kremer, "Silicon Contamination of Coker Products," AIChE 5th International Conference on Refinery Processes, Mar. 12, 2002.
PCT International Search Report for PCT/US2004/039150, Mar. 14, 2005.
L. N. Kremer, et al., "Foam Control Methods in Delayed Cokers," Petroleum Technology Quarterly, Summer 2002, pp. 65-69.

* cited by examiner

*Primary Examiner*—Walter D. Griffin
*Assistant Examiner*—Natasha Young
(74) *Attorney, Agent, or Firm*—Madan, Mossman & Sriram P.C.

(57) ABSTRACT

It has been discovered that crosslinked polydimethylsiloxane (PDMS) resins are useful defoamers and antifoamers for hydrocarbon-containing liquids, such as delayed coker feedstocks and feedstocks to preflash and atmospheric towers. These PDMS resins are crosslinked with either alkyl polysilicate or siloxane. The crosslinked PDMS resins may be used alone or together with linear PDMS, and are typically blended with a carrier such as kerosene for easier handling. Importantly, the use of crosslinked branched PDMS resins permit less total amount of polysiloxanes to be used, which reduces the silicon carryover in coker products and reduces poisoning of downstream catalysts.

6 Claims, No Drawings

US 7,427,350 B2

SILICONE DEFOAMER TO BETTER CONTROL HYDROCARBON FOAM AND REDUCE SILICON CONTENT OF LIQUID HYDROCARBON PRODUCTS

CROSS-REFERENCE TO RELATED APPLICATION

This application claims the benefit of U.S. provisional application No. 60/525,235 filed Nov. 25, 2003.

FIELD OF THE INVENTION

The present invention relates to methods and compositions for controlling foaming of hydrocarbon liquids, and more particularly relates, in one embodiment, to methods and compositions for preventing or reducing foaming of coker feedstocks with polydimethylsiloxanes that permit reduced silicon content of coker liquid products.

BACKGROUND OF THE INVENTION

Many petroleum refineries utilize a delayed coking unit to process residual oils. In delayed coking, overhead vapors from the coking drum pass to a fractionator where various fractions are separated. One of the fractions is a gasoline boiling range stream. This stream, commonly referred to as coker gasoline or coker naphtha, is generally a relatively low octane stream, unsuitable for use as an automotive fuel without upgrading. With the limitations on octane improving additives imposed by environmental concerns, it has become desirable to process coker gasoline naphtha in an octane improving unit such as a catalytic reformer. Sulfur compounds in coker gasoline are detrimental to catalytic reforming catalysts, and accordingly it has become commonplace to treat coker gasoline in a catalytic desulfurizer prior to processing it in a catalytic reformer. These steps of delayed coking, desulfurization and reforming are well developed commercial processes which are widely used in the refining industry. Hydrodesulfurization (HDS) catalysts can be undesirably poisoned by silicon. Silicon can also poison reformer catalyst which is even more expensive.

In the delayed coking process, quantities of foam are often produced which are undesirable as the foam diminishes the efficiency of the delayed coking process. It is customary, as described in U.S. Pat. No. 3,700,587, to add silicone defoamers, for example polydimethylsiloxanes, to delayed cokers to control the undesirable foaming. Thus, one of the recurring concerns in the coker is contamination of the products with silicon species that can eventually poison hydrotreater catalyst and cause the expensive catalyst to be replaced prematurely. Since the silicone-based defoamer used in the coke drum is believed to be a major source of the silicon contamination, considerable effort has been expended to minimize or eliminate the use of silicone oil from the unit. The silicone oil acts both as a defoamer to knock down foam in the drum when the silicone oil is first injected and also acts as an antifoam agent to prevent the subsequent build-up of foam. Due to silicone oil's unique surface properties and thermal stability, there has not yet been a commercially viable non-silicone defoamer replacement.

There are two routes for the silicone to leave the coke drum and contaminate the products of the fractionator: 1) the original molecule of silicone can become physically entrained in the overhead gases, or 2) the original silicone molecule can break down into small enough pieces to distill over with the liquid products. The silicone that is typically used in cokers is of such high molecular weight that it will not distill at coker temperatures. However, L. Kremer in "Silicon Contamination of Coker Products", AIChE 5$^{th}$ International Conference on Refinery Processes, Mar. 12, 2002, presents laboratory results on the thermal degradation of silicone oil. Breakdown products are primarily cyclic trimers and tetramers of polydimethylsiloxane, and have boiling points of 134° C. (273° F.) and 175° C. (347° F.), which explains why they distill in the coker products.

U.S. Pat. No. 4,176,047 describes that a gasoline boiling range hydrocarbon stream obtained by fractionation of overhead vapors from a delayed coker may be treated for removal of organic silicon compounds prior to being processed in a desulfurizer and catalytic reformer. The stream is treated by a bed of material such as alumina, activated alumina or spent alumina-based desulfurizer catalyst at elevated temperature to reduce the level of organic silicon compounds. The organic silicon compounds, if not removed, are detrimental to desulfurizer and reformer catalysts. The organic silicon compounds are conventionally added to a delayed coker to control foaming.

It would be desirable, however, to also provide a method and/or composition that would minimize the amount of silicon in the coker products in the first place.

SUMMARY OF THE INVENTION

Accordingly, it is an object of the present invention to provide a composition and method for minimizing or reducing the amount of silicon in products of delayed coking and other processes where the foaming of hydrocarbon-containing liquids is a problem.

It is another object of the present invention to provide a composition and method for minimizing or reducing the amount of silicon in products of delayed coking, yet effectively controls foam during delayed coking.

In carrying out these and other objects of the invention, there is provided a method for reducing foaming of a hydrocarbon-containing liquid that involves adding to the hydrocarbon-containing liquid that is susceptible to foaming an effective amount to reduce foaming of a composition that includes crosslinked polydimethylsiloxane (PDMS). The PDMS is crosslinked with a siloxane and/or an alkyl polysilicate crosslinker. Less crosslinked PDMS is necessary to achieve the same foam reduction compared to a linear PDMS. The hydrocarbon-containing liquid may be coker hydrocarbons, vis-breaker hydrocarbons, atmospheric tower hydrocarbons, vacuum tower hydrocarbons, pre-flash vessel hydrocarbons, LC finer hydro-processor hydrocarbons, catalytic hydrocracker hydrocarbons, asphalts, lubricants, motor oils, petrochemical hydrocarbons, steel plant coke by-product BTX (benzene, toluene and xylene) and/or hydrocarbon solvents, including naturally occurring hydrocarbon solvents such as terpenes, in a non-restrictive example.

In another non-limiting embodiment of the invention, there is provided a refinery process that concerns a delayed coking operation which includes reducing foaming of a coker feedstock susceptible to foaming that involves adding to the coker feedstock before and/or during the delayed coking operation an effective amount of a composition. The composition includes PDMS crosslinked with a siloxane and/or an alkyl polysilicate crosslinker. A smaller quantity of crosslinked PDMS is necessary to achieve the same foam reduction compared to a linear PDMS.

There is provided in an additional non-restrictive embodiment of the invention a hydrocarbon liquid that includes an effective amount to reduce foaming of a composition including polydimethylsiloxane (PDMS) crosslinked with a siloxane and/or an alkyl polysilicate crosslinker. The hydrocarbon liquid may be asphalts, lubricants, motor oils petrochemical hydrocarbons, steel coke by-product BTX, hydrocarbon solvents, and hydrocarbon liquids contained in equipment selected from the group consisting of cokers, vis-breakers, atmospheric towers, vacuum towers, pre-flash vessels, and combinations thereof. The effective amount is less than that necessary to achieve the same foam control compared to a linear PDMS.

DETAILED DESCRIPTION OF THE INVENTION

Antifoam compositions based on linear polydimethylsiloxane (PDMS) and halogen-substituted PDMS are known to be defoamers in delayed cokers. Until now, no other material has been found to work in such applications. The inventor has discovered that a blend of linear PDMS and a PDMS crosslinked with siloxane (resin) or alkyl polysilicate can be used to control or reduce foam with significantly less carryover of silicon into the coker products, and thus less risk of product contamination and downstream catalyst poisoning. Indeed, it is expected that cross-linked PDMS with siloxane alone will work to control or reduce foam. In the blend embodiment of the invention, the materials are diluted in kerosene, naphtha, coker gas oil or other suitable hydrocarbon carrier for ease of handling. The product or composition can be fed to the coker feedstock, or into the side of the delayed coker, but most commonly is injected by a quill into the top of the coke drum. The amount of product used is dependent upon the foaming conditions, but would typically be about 0.1-250 ppm based on the hydrocarbon charge to the drum. A non-limiting, alternative lower limit for this range is about 1 ppm.

In more detail, the PDMS crosslinked with siloxane resin or alkyl polysilicate (also called crosslinked dimethylsiloxane resin) has —OH or —OCH$_3$ or —(CH$_3$)$_3$ endblocks. These crosslinked PDMS materials are also called branched PDMS materials because three-dimensional, rather than linear, structures are formed. These branched PDMS materials are not a hydrophobic silica type (which has the structure of silica particles that have been reacted with silicone oil to cover the surfaces thereof with PDMS), and behave similarly to a fluorosilicone in some respects. Hydrophobic silica has the structure of silica particles that have been reacted with silicone oil to cover the surface of the particles with PDMS. In one non-limiting embodiment of the invention, the Mn of a branched PMDS was about 12,000, the Mw was about 27,500, the Mz was about 46,800 and the polydispersity was about 2.3. The alkyl group in the alkyl polysilicate crosslinker may have from 1 to 5 carbon atoms. These crosslinked materials are described in U.S. Pat. No. 5,908,891 and U.S. Patent Application Publication 2003/0119917 A1, both incorporated herein by reference. The crosslinked PDMS may optionally contain a silica filler. These patent documents teach the use of the materials as defoamers in brownstock wash aids (e.g. Kraft pulp black liquor). In contrast, the inventive method herein is the first application of these materials to high temperature nonaqueous systems where defoamer decomposition is an important consideration. As noted, the PDMS crosslinked with siloxane or alkyl polysilicate may be used alone, but is herein expected to be optionally or more typically blended with a linear, non-crosslinked PDMS and combined with a hydrocarbon carrier. These materials have been tested by thermogravimetric analysis (TGA) and found to have stabilities comparable to other silicone products currently in use and will not immediately distill over in overhead gases from the delayed coker.

The linear PDMS used in the blend embodiment of this invention may have a kinematic viscosity of from about 60,000 to about 1,000,000 cst. In another non-limiting embodiment of the invention, the upper range of the kinematic viscosity for the linear PDMS is 600,000 cst, while an alternative lower limit of kinematic viscosity for this material may be about 12,500 cst, and in a further non-limiting embodiment, the lower limit of the range may be about 1,000 cst.

The weight ratio of crosslinked PDMS to linear PDMS may range from about 95:5 to about 5:95. In another non-limiting embodiment of the invention, the weight ratio of crosslinked PDMS to linear PDMS may range from about 90:10 to about 10:90.

In another non-limiting embodiment of the invention, a carrier is used with the PDMS materials to assist in handling them. Suitable carriers include, but are not necessarily limited to, glycol, mineral oil, polyisobutylene oligomers or polymers kerosene, coker gas oil, coker naphtha, coker diesel, naphtha, and other aromatic solvents, and the like, and mixtures thereof. When the materials of the invention are used to control or reduce foam in coker feedstocks, it is advantageous and convenient to use a readily available stream such as coker gas oil, coker naphtha, coker diesel or other suitable stream. By suitable is meant that no separation of components occurs leading to or during the delayed coking process, that is the compositions are stable. The foam control composition, which may already have a carrier, can be diluted in the range of about 5:1 up to about 200:1 or greater as it is injected. Typical dilutions in a non-limiting embodiment range from about 20:1 to about 50:1.

The proportion of the polysilicone materials, whether present as a blend, or if only the crosslinked, branched PDMS is used alone, may range from about 1 to about 50 wt % based on the total components, including carrier, if present. In another non-limiting embodiment, the proportion of the polysilicone materials ranges from about 5 to about 40 wt %.

In one non-limiting embodiment a three-component blend may be used, including, but not necessarily limited to, a linear PDMS of about 600,000 cst, a crosslinked PDMS and a solvent that is kerosene and/or polybutylene.

As noted, it is difficult to predict in advance what the proportion of the polysilicone components in the composition of this invention should be in the hydrocarbon-containing liquid that it is applied to. This proportion would depend on a number of complex, interrelated factors including, but not necessarily limited to, the nature of the hydrocarbon-containing fluid, the temperature and pressure conditions of the coker drum or other process unit, the amount of foam developed in the particular process unit, the particular inventive composition used, etc. Nevertheless, in order to give some sense of suitable proportions, the proportion of the active PDMS components of the inventive composition (crosslinked and linear) may be applied at a level between about 0.1 ppm to about 1000 ppm, based on the hydrocarbon fluid. In another non-limiting embodiment of the invention, the upper end of the range may be about 250 ppm, and alternatively up to about 25 ppm. In a different non-limiting embodiment of the invention, the lower end of the proportion range for the PDMS materials may be about 0.1 ppm, and alternatively, another non-limiting range may be about 0.1 to 15 ppm.

Besides use as a coker antifoam or defoam composition, it is expected that the compositions of this invention will find utility in other applications and process units where hydrocarbon-containing liquids present foaming problems. Other uses would be in preflash and atmospheric towers. Preflash towers operate at temperatures closer to oil field applications, for instance at least about 350° F. (about 177° C.), whereas delayed cokers and other units often operate at about 700 to 950° F. (about 371-510° C.). It is expected that the temperature of the hydrocarbon-containing liquid is or would be at least about 400° F. (about 204° C.). Alternatively, the temperature of the hydrocarbon-containing liquid ranges from about 350° F. (177° C.) to about 1000° F. (538° C.).

It will be appreciated that it is not necessary that the compositions of this invention completely eliminate foaming or reduce foaming to zero in their particular application to be considered successful. It is only necessary that the foaming level be reduced, suppressed, controlled or otherwise regulated. As noted, the compositions of this invention can be used both to prevent and/or inhibit foam from forming in the first place, and/or to reduce or defoam liquid that has already evolved foam.

Furthermore, although the use of the foam reducing compositions of this invention are most typically discussed with respect to the hydrocarbons used in cokers, such as delayed cokers, it will be appreciated that the method and compositions of this invention are not necessarily limited to these applications. It is expected that the methods and compositions of this invention would also find utility and be readily adapted for use in hydrocarbons used in and contained in vis-breakers, atmospheric towers, vacuum towers, pre-flash vessels, and in hydrocarbons such as asphalts, lubricants, motor oils, and the like. It is expected that one having ordinary skill in the art, having understood the invention herein, can readily adapt it to these other applications.

It has been discovered that the crosslinked PDMS permits the total silicon dosage to be much less than for traditional linear PDMS while achieving better foam control or suppression, and thus reduce the problem of silicon carryover to minimize problems downstream, such as reduction of possible hydrotreater catalyst degradation. Stated another way, less crosslinked PDMS is necessary to achieve the same foam control compared to a conventional linear PDMS. Without wanting to be limited to any particular explanation or mechanism, the crosslinked PDMS is somehow more effective than the conventional linear PDMS for comparable silicon contents.

The invention will now be described with respect to certain more specific Examples which are only intended to further describe the invention, but not limit it in any way.

EXAMPLES 1-4

Stability Testing

The formulations shown in Table I were prepared.

TABLE I

Stability Formulations (in grams)

| | Ex. | | | |
|---|---|---|---|---|
| Component | 1 | 2 | 3 | 4 |
| Crosslinked PDMS | 1.01 | 0.52 | 0.52 | 0.52 |
| 600 K cst Linear PDMS | 6.00 | 3.03 | — | — |
| 100 K cst Linear PDMS | — | — | 5.70 | 5.60 |
| Kerosene | 92.80 | 46.57 | 45.20 | 44.00 |
| Total | 99.81 | 50.06 | 51.42 | 50.12 |

The formulations from Examples 1-4 were put in a 120° F. (49° C.) oven for the storage stability test. One week later, all of the samples were clear and free flowing with no layering. At two weeks, all samples had low viscosity with no precipitation or separation.

EXAMPLES 5 AND 6

Field Test—First Refinery Trial

A field trial was conducted using an Example 5 formulation of 93 wt % kerosene, 1%-crosslinked PDMS, and 6% 600,000 cst linear PDMS. The typical procedure is to place the kerosene in the vessel first, due to the viscosity of the polysiloxanes. The two polymers were simply blended into the kerosene. However, the invention is not limited by the order of addition and the polymers could be mixed together first prior to the addition of kerosene or other carrier. The inventive Example 5 formulation was contrasted with comparative Example 6 which was 10 wt % 600,000 cst linear PDMS in kerosene to establish a base line. The linear PDMS used is BPR 45160 defoamer available from Baker Petrolite and is an industry standard defoamer for cokers. This is the currently best available commercial product as identified in the L. Kremer paper "Silicon Contamination of Coker Products", id.

Comparative antifoam composition 6 contains 10% active component. Inventive composition B contains 7% active component (both 600,000 cst linear PDMS, as well as crosslinked PDMS). Formulations 5 and 6 were roughly formulated to be about the same raw material cost. The inventive Ex. 5 formulation was fed to a pair of coker drums in a delayed coking unit at a refinery, while the comparative Ex. 6 formulation was fed to the same two drums for 40 days prior to using the experimental composition. The products were fed at the same gallons (liters) per minute feed rate. The baseline period was about 40 days, and the antifoam test period was about 17 days.

It was observed that the Ex. 5 formulation knocked the foam down better than the base line when injected in the drum and also controls the level during refoam after the drum switch. The drum switch refoam is actually the limiting factor to improving outage. By reducing outage, a refinery would be able to increase the charge rate to the coke drum, so that the refinery could make increased product for the same capital and labor costs. Thus, an important economic driving force on a delayed coker is to reduce outage.

Samples of coker naphtha and coker kerosene from about 1 hour before the drum switch were collected and the silicon levels of each measured in a laboratory. The results are shown in Table II. The smaller values for the Example 5 formulation show a greater than 50% reduction in silicon carryover. This is an important advantage to refinery economics to reducing frequency of replacement of hydrodesulfurization (HDS) catalyst.

TABLE II

| | Silicon Carryover | |
|---|---|---|
| | Coker Naphtha, ppm | Coker Kerosene, ppm |
| Comp. Example 6 - Base value | 3.29 | 4.41 |
| Inv. Example 5 - During trial | 1.29 | 1.92 |

Table III presents data on the difference in foam drop and refoam data. The difference in foam drop when the defoamers were injected was also impressive, with the Example 5 formulation dropping the foam level by 11.4 feet (3.5 m), compared with only 7.6 feet (2.3 m) for Example 6. The refoam data is also very important and additionally impressive where the Example 5 formulation only gave a refoam height of 3.1 feet (0.9 m).

TABLE III

Foam Heights

| | Foam Drop | | Refoam Height | |
|---|---|---|---|---|
| | feet | meters | feet | meters |
| Comp. Example 6 | 7.6 | 2.3 | 5.0 | 1.5 |
| Inv. Example 5 | 11.4 | 3.5 | 3.1 | 0.9 |

The inventive Example 5 formulation could permit reduced outages and can reduce silicon contamination of products by over 50%, as seen in Table IV.

TABLE IV

First Refinery Trial Silicon Content Data

| Sample | Comp. Ex. 6 - Si (ppm) | Inv. Ex. 5 - Si (ppm) | % Reduction |
|---|---|---|---|
| Coker naphtha | 3.29 | 1.29 | 62.5 |
| Coker kerosene | 4.41 | 1.92 | 56.5 |

EXAMPLES 7-13

Pilot Unit Tests with Foam Control Compositions

The foam control/antifoam samples used in Examples 7-13 are described in Table IV. Crosslinked, branched PDMS formulations (a) through (e) vary from one another in molecular weight and branching agent used. Materials (a) and (c) are alkyl polysilicate crosslinked materials, whereas materials (b), (d) and (e) are siloxane crosslinked materials. The difference between materials (a) and (c) is that (a) contains 40% Indopol L-14 polybutene from BP Chemicals. The material (b) started with 30,000 cst PDMS, the highest molecular weight PDMS of the group (a)-(e). Materials (d) and (e) had different ratios of PDMS to crosslinker, but as will be seen, this did not seem to make much difference. The material (e), and possibly material (d) started with a lower molecular weight PDMS than material (a). Amounts reported are in volume percent.

TABLE V

Foam Control Compositions

| | | | Crosslinked, branched PDMS | | | | |
|---|---|---|---|---|---|---|---|
| Comp. | Kerosene | 600,000 cst linear PDMS | (a) | (b) | (c) | (d) | (e) |
| A | 90 | — | 10 | | | | |
| B | 90 | 8 | 2 | | | | |
| C | 90 | 8 | | | 2 | | |
| D | 90 | 8 | | | | 2 | |
| E | 90 | 8 | | | | | 2 |
| F | 90 | 8 | 2 | | | | |

Tests were conducted with the six antifoam compositions A-F. The resid coker feed (i.e. a blend of resid and solvent deasphalting bottoms) used for these tests was obtained from an Oklahoma refinery. Tests were carried out at a temperature of 900° F. (482° C.), a pressure of 15 psig (0.1 MPa) and a feed rate of 3600 gm/hr. Table V gives the antifoam injection data for these runs. All runs used as needed overhead injection of antifoam. Two antifoams were tried in each run with a total of six antifoams used in three runs. Severe foaming occurred with this resid and hence an antifoam concentration of (3/70) was required to control foaming.

The engineers running the pilot plant had several years of daily experience evaluating foam. As will be seen, they determined that Composition C performed much better than B, which was better than E, which was better than D, which was better than F, and all were better than Composition A.

TABLE VI

Antifoam Injection Data

| Run | Example 7 A (0.3/70) | Ex. 8 A (3/70) | Ex. 9 B (3/70) | Ex. 10 C (3/70) | Ex. 11 D (3/70) | Ex. 12 E (3/70) | Ex. 13 F (3/70) |
|---|---|---|---|---|---|---|---|
| | | Antifoam (total amount injected with diesel, cc) | | | | | |
| 1 | 60 | 45 | 81 | | | | |
| 2 | | | | 65 | 40 | | |
| 3 | | | | | | 50 | 45 |

During Run 1 (Compositions A and B), severe foaming occurred and anti-foam A with a concentration of (0.3/70) was injected through the overhead (Example 7). No substantial collapse of foam was observed with this antifoam. The foam height in the drum continued to increase with time. To control foaming antifoam A with a concentration of (3/70) was injected through the overhead. A total of 45 cc of antifoam was injected continuously. No collapse of foam was observed. The anti-foam composition was switched to B with a concentration of (3/70). The first injection of B collapsed the foam height by approximately 30 inches (75 cm). The reappearance of foam with this resid is very quick compared to some other resids which are severe foaming resids as well. Hence, foaming occurred periodically with this resid and subsequent injections of antifoam B (3/70) collapsed the foam effectively. After around 100 minutes into the run, foaming ceased to occur and no further antifoam injections were made.

Antifoam compositions C and D were tested during Run 2. Severe foaming started to occur as soon as 15 minutes into the run. Antifoam C with a concentration of (3/70) was injected through overhead to control foaming. A foam collapse of almost 30 inches (75 cm) was observed. Within the next 60 seconds, the foam reappeared with a drum height of 50 inches (127 cm). Subsequent injections with antifoam C collapsed the foam effectively. The antifoam was switched to D with a concentration of (3/70). Four injections were made with antifoam D through the overhead and collapse of the foam was observed. The antifoam was switched back again to C and two more injections were made through the overhead. It was observed that antifoam C collapsed the foam more effectively compared to antifoam D.

Antifoam E and F were tested during Run 3. Six injections were made with antifoam E (3/70) through the overhead with a total of 50 cc injected. The antifoam had to be injected frequently to control foaming. It was during the fourth injection of antifoam E, that a substantial collapse of foam was observed. With each subsequent antifoam injection with E, a foam collapse of around 10 to 15 inches is observed (25 to 38 cm). The antifoam was then switched to F and five injections were made through the overhead with a total of 45 cc. As observed with E, antifoam F as well required several injections to collapse the foam effectively. Hence, it is speculated that the collapse of foam with these antifoams takes longer compared to antifoams B, C and D.

In conclusion, all six antifoams were tested on the resid at 900° F. (482° C.), a pressure of 15 psig (0.1 MPa) and 3600 gm/hr. This resid foamed badly for the first several hours of the run. The reappearance of foam is the fastest compared to all the resids tested. Antifoam C with a concentration of (3/70) was the most effective in collapsing the foam. Composition C was much better than B, which was better than E, which was better than D, which was better than F, and all were better than Composition A. Antifoam A containing no 600,000 cst linear PDMS was the least effective among all the antifoams, thus this crosslinked material alone did not work as well as the blends with 600,000 cst linear PDMS. The crosslinked materials using a higher molecular weight PDMS starting material, e.g. material (b) (Composition C), provided better defoaming. Composition F (containing crosslinked material (e) that was made starting with a relatively low molecular weight PDMS) performed relatively poorly. Crosslinked materials with intermediate molecular weight starting materials performed in the middle of the range with respect to foam control. Additionally, there seemed to be no clear advantage of the siloxane resin-crosslinked materials as compared to the alkyl polysilicate-crosslinked materials.

EXAMPLE 14

Second Refinery Trial

The antifoam compositions of Examples 5 and 6 were tested in a refinery coker that produces anode coke. This operation had difficulty with silicon in the product poisoning downstream catalysts, in part due to excessive defoamer usage. The operation had used Comparative Example 6 formulation (600,000 cst linear PDMS defoamer) for four years. Results are presented in TABLE VII.

TABLE VII

| First Refinery Trial Silicon Content Data | | | |
| --- | --- | --- | --- |
| Product | Comp. Ex. 6 - Si (ppm) | Inv. Ex. 5 - Si (ppm) | % Reduction |
| Drum 1 | | | |
| Naphtha | 58 | 35.9 | 38% |
| LCGO | 38.8 | 10.3 | 73% |
| HCGO | 5.5 | 2.2 | 60% |
| Drum 2 | | | |
| Naphtha | 33.8 | 8.2 | 75% |
| LCGO | 28.7 | 3.2 | 88% |
| HCGO | 1.8 | 0.9 | 50% |

LCGO = light coker gas oil
HCGO = heavy coker gas oil

It may be readily seen that inventive Example 5 reduced silicon content in the product. It was also found that it is more efficient to add the defoamer composition early; the foam is easier to prevent than knock down once formed, and less defoamer is used. The inventive Example 5 is easy to handle, and is also more stable than conventional coker defoamers. Further, the inventive foam compositions control foam better, and may enable reduced outages.

In the foregoing specification, the invention has been described with reference to specific embodiments thereof, and has been demonstrated as effective in controlling foams and reducing refoam in delayed coker drums, as non-limiting examples. The inventive compositions and methods have also been demonstrated to reduce silicon carryover in coker drum products. However, it will be evident that various modifications and changes can be made thereto without departing from the broader spirit or scope of the invention as set forth in the appended claims. Accordingly, the specification is to be regarded in an illustrative rather than in a restrictive sense. For example, specific crosslinked PDMS, and combinations thereof with other polysilicones, and different hydrocarbon-containing liquids other than those specifically exemplified or mentioned, or in different proportions, falling within the claimed parameters, but not specifically identified or tried in a particular application to reduce or inhibit hydrocarbon foaming, are within the scope of this invention. Similarly, it is expected that the inventive compositions will find utility as foam-controlling compositions for other hydrocarbon-containing fluids besides those used in delayed coker units.

I claim:

1. A refinery process comprising a delayed coking operation further comprising reducing foaming of a coker feedstock susceptible to foaming comprising adding to the coker feedstock before and/or during the delayed coking operation an effective amount of a composition comprising polydimethylsiloxane (PDMS) crosslinked with a crosslinker selected from the group consisting of siloxane and alkyl polysilicate to reduce foaming, where less crosslinked PDMS is necessary to achieve the same foam reduction compared to a linear PDMS, where the effective amount of the total amount of polydimethylsiloxanes is in a ratio of from about 0.1 ppm to about 250 ppm based on the coker feedstock to be defoamed, and where the temperature of the coker feedstock ranges from about 350° F. (177° C.) to about 1000° F. (538° C.).

2. The refinery process of claim 1 where the crosslinked PDMS comprises endblocks selected from the group consisting of —OH, —OH$_3$ and —(OH$_3$)$_3$ endblocks.

3. The refinery process of claim 1 where the composition further comprises a linear polydimethylsiloxane having a kinematic viscosity in the range of from about 1,000 to 1,000,000 cst and where less total amount of crosslinked PDMS and linear PDMS is necessary to achieve the same foam reduction compared to only a linear PDMS.

4. The refinery process of claim 3 where the ratio of crosslinked PDMS to linear polydimethylsiloxane in the composition ranges from about 95:5 to about 5:95 weight ratio.

5. The refinery process of claim 3 where the total amount of polydimethylsiloxanes in the composition are used in a ratio of from about 0.1 ppm to about 15 ppm, based on the coker feedstock to be defoamed.

6. The refinery process of claim 1 where the total amount of polydimethylsiloxanes in the composition are used in a ratio of from about 0.1 ppm to about 25 ppm, based on the coker feedstock to be defoamed.

* * * * *

UNITED STATES PATENT AND TRADEMARK OFFICE
CERTIFICATE OF CORRECTION

PATENT NO.         : 7,427,350 B2
APPLICATION NO. : 10/988901
DATED                  : September 23, 2008
INVENTOR(S)       : Lawrence N. Kremer It is certified that error appears in the above-identified patent and that said Letters Patent is hereby corrected as shown below:

At column 10, line 40, claim 2:

Please delete: "—$OH_3$" and insert therefor: -- —$OCH_3$--;

Please delete "—$(OH_3)_3$" and insert therefor: -- —$(CH_3)_3$--;

Signed and Sealed this

Ninth Day of December, 2008

JON W. DUDAS
*Director of the United States Patent and Trademark Office*